United States Patent
Solomon (10) Patent No.: US 7,575,264 B1
(45) Date of Patent: Aug. 18, 2009

(54) CARGO BED STRUCTURE COMPRISING FIBER REINFORCED POLYMER COMPONENTS

(75) Inventor: Greg Solomon, Clayton, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 78 days.

(21) Appl. No.: 11/743,405

(22) Filed: May 2, 2007

Related U.S. Application Data (63) Continuation of application No. 11/686,040, filed on Mar. 14, 2007.

(60) Provisional application No. 60/782,013, filed on Mar. 14, 2006.

(51) Int. Cl.
  *B62D 33/03* (2006.01)
  *B62D 25/20* (2006.01)

(52) U.S. Cl. .............. 296/26.02; 296/26.03; 296/183.1; 296/184.1; 296/57.1

(58) Field of Classification Search .............. 296/26.03, 296/29.02, 181.3, 181.2, 183.1, 184.1, 57.1; 52/588.1, 589.1, 592.1
See application file for complete search history.

(56) References Cited

U.S. PATENT DOCUMENTS

| | | | |
|---|---|---|---|
| 3,986,317 A | 10/1976 | Mountz | |
| 4,003,728 A | 1/1977 | Rath | |
| 4,139,115 A | 2/1979 | Robinson | |
| 4,358,233 A | 11/1982 | Morris et al. | |
| 4,505,126 A | 3/1985 | Jones et al. | |
| 4,553,403 A | 11/1985 | Taylor | |
| 4,726,196 A | 2/1988 | Zajic | |
| 4,951,992 A * | 8/1990 | Hockney | .................... 296/204 |
| 4,957,521 A | 9/1990 | Cullen et al. | |
| 4,976,490 A | 12/1990 | Gentle | |
| 5,044,689 A | 9/1991 | Evers | |
| 5,161,848 A | 11/1992 | Lutton | |
| 5,351,990 A * | 10/1994 | Thomas | ...................... 280/789 |
| 5,403,062 A | 4/1995 | Sjostedt et al. | |
| 5,660,427 A | 8/1997 | Freeman et al. | |
| 5,794,402 A | 8/1998 | Dumlao et al. | |
| 5,807,046 A | 9/1998 | Onken | |
| 5,947,812 A | 9/1999 | Henning et al. | |
| 5,997,067 A * | 12/1999 | Shambeau et al. | ......... 296/57.1 |
| 6,023,806 A | 2/2000 | Dumlao et al. | |
| 6,044,607 A | 4/2000 | Dumlao et al. | |
| 6,076,693 A | 6/2000 | Reiter et al. | |
| 6,089,639 A | 7/2000 | Wojnowski | |

(Continued)

OTHER PUBLICATIONS

Kasmire, R., "Fresh Produce and Perishability," University of California—Davis, posted online (http://www.thepacker.com/rbcs/handbookarticles/properis.htm).

(Continued)

*Primary Examiner*—Jason S Morrow
(74) *Attorney, Agent, or Firm*—Alston & Bird LLP (57) ABSTRACT

The invention provides a cargo bed structure comprising a sub-floor assembly comprising a plurality of cross members in spaced relation and a cargo bed defined by a longitudinally extending load-bearing deck overlying the sub-floor assembly and comprising a plurality of interlocking fiber reinforced polymer decking planks extending in a direction perpendicular to the cross members; an upwardly extending bulkhead assembly comprising at least one fiber reinforced polymer panel; a tailboard opposing the bulkhead and spaced apart therefrom; and two opposing upwardly-extending sidewalls, wherein each of the sidewalls and the tailboard comprise at least one fiber reinforced polymer panel pivotally mounted to the load-bearing deck.

27 Claims, 9 Drawing Sheets

U.S. PATENT DOCUMENTS

| | | |
|---|---|---|
| 6,108,998 A | 8/2000 | Dumlao |
| 6,299,246 B1 | 10/2001 | Tomka |
| 6,364,388 B1 | 4/2002 | Ziegler et al. |
| 6,422,642 B1 | 7/2002 | Grimm et al. |
| 6,439,649 B1 | 8/2002 | Lorenzo et al. |
| 6,467,118 B2 | 10/2002 | Dumlao et al. |
| 6,505,883 B1 | 1/2003 | Ehrlich |
| 6,543,827 B2 | 4/2003 | Miller |
| 6,554,342 B1 | 4/2003 | Burnett |
| 6,645,333 B2 | 11/2003 | Johnson et al. |
| 6,676,785 B2 | 1/2004 | Johnson et al. |
| 6,702,365 B2 | 3/2004 | Semple et al. |
| 6,745,470 B2 | 6/2004 | Foster et al. |
| 6,814,397 B2 | 11/2004 | Henderson et al. |
| 6,843,525 B2 | 1/2005 | Preisler |
| 6,871,904 B2 | 3/2005 | Bhat et al. |
| 6,893,076 B1 | 5/2005 | Lewis |
| 6,902,228 B2 | 6/2005 | Kikuchi |
| 6,941,875 B2 | 9/2005 | Norton |
| 6,945,591 B2 | 9/2005 | Durand |
| 6,945,865 B1 | 9/2005 | Turek |
| 7,152,911 B1 | 12/2006 | McNulty et al. |
| 7,322,640 B2 | 1/2008 | Ni et al. |
| 2005/0057073 A1* | 3/2005 | Hunt ........................ 296/183.1 |
| 2005/0093339 A1* | 5/2005 | Klassen .................... 296/183.1 |
| 2005/0225117 A1* | 10/2005 | Miskech et al. .......... 296/183.1 |
| 2006/0043771 A1 | 3/2006 | Ehrlich |
| 2006/0087152 A1* | 4/2006 | Kuriakose ................ 296/184.1 |
| 2006/0121244 A1 | 6/2006 | Godwin et al. |
| 2006/0123725 A1 | 6/2006 | Godwin |
| 2006/0179733 A1* | 8/2006 | Padmanabhan .............. 52/177 |
| 2006/0201081 A1 | 9/2006 | Godwin |
| 2006/0290158 A1* | 12/2006 | Cullison ..................... 296/57.1 |
| 2007/0095092 A1 | 5/2007 | Wuerfel, III |
| 2007/0216197 A1 | 9/2007 | Wuerfel, III |
| 2007/0222247 A1* | 9/2007 | Jaeck ....................... 296/26.02 |
| 2008/0001430 A1* | 1/2008 | Booher .................... 296/184.1 |
| 2008/0169674 A1* | 7/2008 | Giles ........................ 296/183.1 |

OTHER PUBLICATIONS

Kitinoja, L. et al., "Transportation of Horticultural Crops," *Small-Scale Postharvest Handling Practices—A Manual for Horticultural Crops*, 1995, 3$^{rd}$ ed., University of California—Davis, posted online (http://www.fao.org/wairdocs/x5403e/x5403e0a.htm).

Thermo King Corporation (Ingersoll-Rand Company Limited) Air Management Systems product brochure.

* cited by examiner

CARGO BED STRUCTURE COMPRISING FIBER REINFORCED POLYMER COMPONENTS

CROSS-REFERENCE TO RELATED APPLICATIONS

This application is a continuation of U.S. application Ser. No. 11/686,040, filed Mar. 14, 2007, which claims priority to U.S. Appl. Ser. No. 60/782,013, filed on Mar. 14, 2006, all of which are incorporated by reference herein in their entirety.

FIELD OF THE INVENTION

The present invention is directed to a cargo bed structure comprising one or more components constructed of fiber reinforced polymer, particularly cargo bed structures featuring pivoting sidewall and tailboard sections.

BACKGROUND OF THE INVENTION

Cargo bed structures in trucks and trailers are conventionally constructed primarily of steel or wood. However, structures made of such materials suffer from several disadvantages. For example, although steel has a number of desirable properties such has high strength, it is also quite heavy and costly to ship. Further, steel is susceptible to corrosive attack when exposed to fresh water, salt water, oxygen, and other environmental elements such as acid rain, road salts, and other chemicals. The rusting and corrosion of steel weakens the structures made therefrom and can eventually lead to structural failure. As with steel, wood is also susceptible to various types of environmental attack, particular rot from weather exposure and damage from termites. These environmental attacks can lead to a drastic reduction in structural strength and compromise the integrity of the overall structure.

Due to the vulnerability of both steel and wood to environmental attack, frequent and costly maintenance is required to increase the useable life of structures made from such materials. For example, frequent painting or other surface treatment is typically necessary to provide a temporary barrier against corrosion or rot.

Although the use of steel and wood suffer from the disadvantages outlined above, their use is still prevalent in cargo bed structures primarily due to availability, relatively ease of machining or other processing, and because the properties of such materials are relatively consistent and well-known. However, in light of the shortcomings of these conventional construction materials, there is an art-recognized continuing need for load-bearing cargo bed structures that are lightweight and strong, as well as resistant to corrosion and other environmental attack even without surface treatment.

BRIEF SUMMARY OF THE INVENTION

The present invention provides a cargo bed structure for vehicles that incorporates one or more fiber reinforced polymer components in a manner that reduces the weight of the cargo bed, greatly improves weatherability and durability against environmental attack, but still provides the same level of performance associated with cargo bed structures formed entirely of conventional materials, such as commercially acceptable strength and cargo loading capabilities. The present invention provides cargo bed structures that can be incorporated into trucks or trailers, wherein fiber reinforced polymer components form at least a portion of the load-bearing deck of the cargo bed and/or portions of the bulkhead, sidewalls or tailboard sections. The resulting cargo bed structures are more durable and have longer useable life than conventional structures without the need for costly and frequent surface treatments on all surfaces, while still delivering the loading performance expected in such structures. The reduction in weight provided by cargo bed structures of the invention as compared to known cargo bed assemblies enhances the flexibility of the cargo bed in terms of total load weight that can be carried by the vehicle.

In one aspect, a cargo bed structure is provided that comprises a sub-floor assembly comprising a plurality of cross members in spaced relation and a load-bearing deck overlying the sub-floor assembly. The load-bearing deck comprises a plurality of interlocking fiber reinforced polymer decking planks extending in a direction perpendicular to the cross members. The decking planks comprise a first planar section have a load-bearing surface and an opposing surface and two opposed longitudinally extending edges. At least one support rib projects from the opposing surface of the planar section, the support rib comprising a planar portion adapted for interfacing with the cross members. The decking planks further comprise a first interlocking panel projecting from the opposing surface at one of the two opposed longitudinally extending edges of the planar section, the interlocking panel comprising a longitudinally extending channel and a planar portion adapted for interfacing with the cross members. A second interlocking panel also projects from the opposing surface of the planar section at the location of the other longitudinally extending edge, the second interlocking panel comprising a longitudinally extending protrusion adapted for insertion into the channel of the first interlocking panel such that two adjacent decking planks are interlocked together. The second interlocking panel also includes a planar portion adapted for interfacing with the cross members.

The support ribs of the decking plank can provide a planar portion adapted for interfacing with the cross members of the sub-floor assembly. In one embodiment, the decking plank comprises a plurality of support ribs based apart across the opposing surface of the planar section, such as between about two and about five support ribs per decking plank. In one embodiment, the first and second interlocking panels are substantially L-shaped, with the bottom surface of the L forming the planar portion that is adapted for interfacing with the cross members of the sub-floor assembly. The longitudinally extending channel and protrusion of the interlocking panels of the decking planks can be substantially rectangular in cross-section, although other mating cross-sections can be used without departing from the invention. The interlocking fiber reinforced polymer decking planks can be of single-piece construction.

In certain embodiments, the cargo bed is further defined by an upwardly-extending bulkhead assembly and opposed tailboard, and two opposed upwardly-extending sidewalls, wherein the bulkhead assembly and opposed tailboard are positioned substantially perpendicular to the opposing sidewalls. Each sidewall can comprise at least one fiber reinforced polymer panel, the panel being pivotally mounted to the load-bearing deck such that the panels can be pivoted between a first position extending upwardly and substantially perpendicularly to the load-bearing deck and the second position extending outwardly from the load-bearing deck in substantially the same plane as the load-bearing deck.

In one embodiment, each opposing sidewall comprises two fiber reinforced polymer panels, each panel pivotally mounted to the load-bearing deck. The cargo bed structure may further comprise corner support posts affixed to the load-bearing deck at the corners thereof and a middle support post affixed to the load-bearing deck between the two fiber reinforced polymer panels of each side wall. In this embodiment, the fiber reinforced polymer panels of the sidewalls can comprise a latching mechanism adapted for latching the panels to an adjacent corner support post and an adjacent middle support post while in the first upwardly extending position. In certain embodiments, each sidewall is able to withstand a load of at least 600 pounds at any position thereon while in the lowered second position.

The tailboard can also comprise a fiber reinforced panel pivotally mounted to the load-bearing deck such that the tailboard can be pivoted between and first position and a second position substantially as described above in connection with the sidewalls. The fiber reinforced panel of the tailboard may comprise a latching mechanism adapted for latching to each of the corner support post approximate to the tailboard while the tailboard is in the upwardly extending first position.

The bulkhead assembly can also comprise at least one fiber reinforced panel and the corner posts adjacent to the bulkhead assembly also can be constructed of a fiber reinforced polymer. The bulkhead assembly is optionally affixed to a support beam positioned beneath the bulkhead.

In another aspect of the invention, the cargo bed structure further comprises a longitudinally extending window assembly removably attached to each of the sidewalls and the tailboard. The window assembly comprises a fiber reinforced polymer lower frame member adapted to support at least one removal section of ballistic glass, a section of ballistic glass carried by the lower frame section, and a removable fiber reinforced polymer top frame member overlying the ballistic glass section. The window assembly can comprise a plurality of removable ballistic glass sections in spaced relation carried by the lower frame member, the window assembly further comprising a fiber reinforced polymer column between each ballistic glass section. In use, the top frame member of the window assembly can be removed in order to gain access of the ballistic glass sections, which can then be removed as desired to form open ports within the window assembly. The top frame member can then be repositioned overlying the remaining ballistic glass sections. The lower frame member may comprise a substantially U-shaped channel operatively positioned to carry the removable ballistic glass section and a substantially U-shaped channel positioned to bracket the top of the sidewalls and the tailboard in order to be temporarily affixed thereto. A plurality of retaining pins can be operatively positioned to temporarily affix the window assembly to the top of each of the sidewalls and the tailboard.

In another aspect, the invention provides a cargo truck comprising the above-described cargo bed structure.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The singular forms "a," "an," and "the" include plural referents unless the context clearly dictates otherwise.

Although some embodiments of the invention described herein are directed to a cargo bed structure of a fixed-bed cargo truck, it will be appreciated that the invention is not so limited. For example, aspects of the cargo bed design of the present invention can also be incorporated into towed trailers or trucks with dumping beds.

Figure 1:
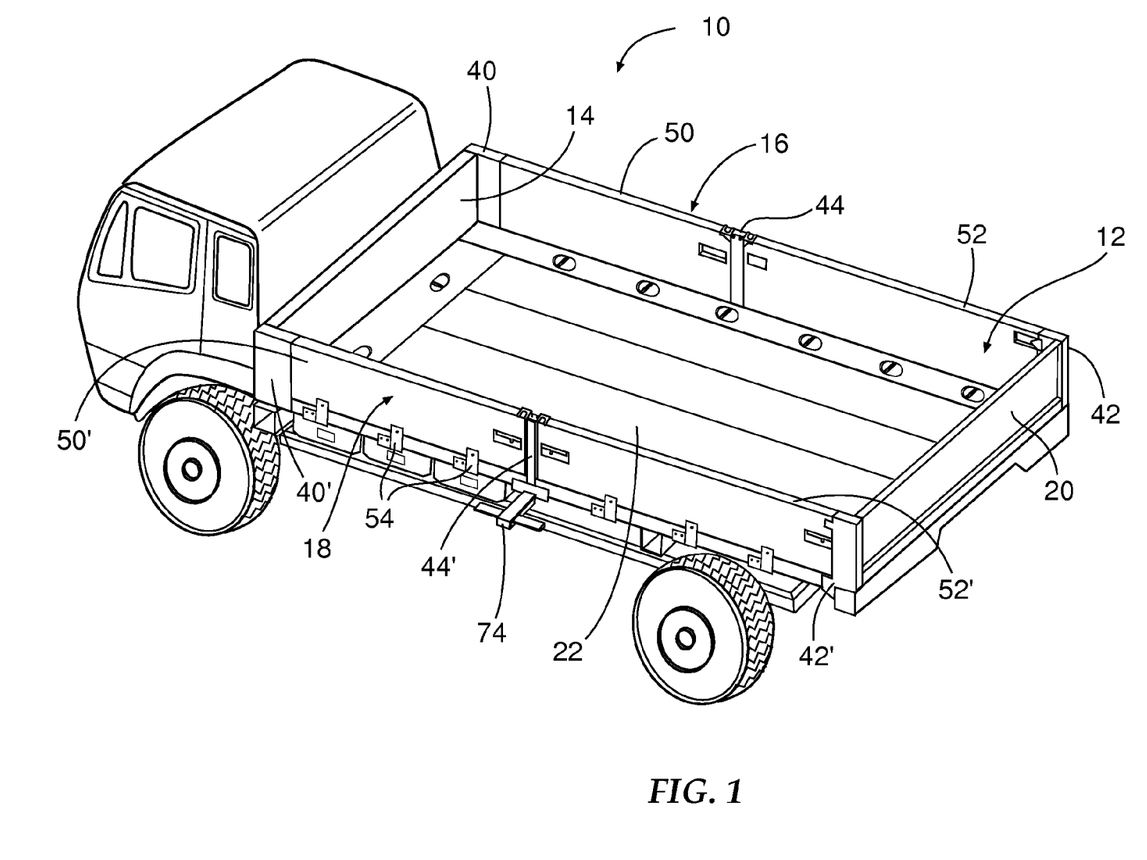
FIG. 1 is a perspective view of a truck comprising an embodiment of the cargo bed structure of the invention.

Referring to FIG. 1, one embodiment of the present invention provides a truck 10 comprising a cargo bed structure 12, which comprises a bulkhead assembly 14, opposing sidewalls, 16 and 18, and a tailboard 20. The cargo bed structure 12 is further defined by a load-bearing deck 22.

As also shown in FIG. 1, the cargo bed structure 12 further comprises two forward corner support posts 40, 40' positioned on either side of the bulkhead assembly 14 and two rearward corner posts 42, 42' positioned on either side of the tailboard 20. The cargo bed structure 12 further comprises two middle support posts 44, 44', one affixed to each longitudinally extending side of the load-bearing deck 22.

Figure 2A:
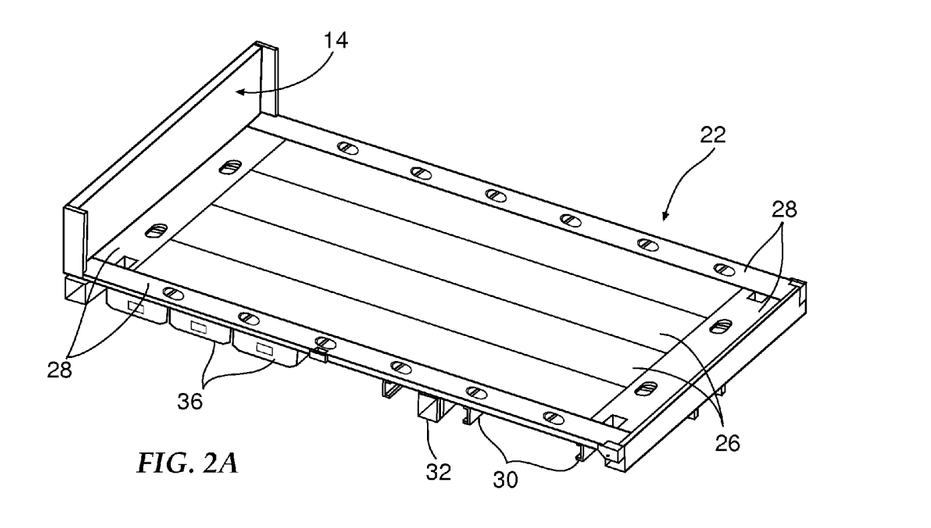
FIG. 2A is a perspective view of the load-bearing deck of an embodiment of the cargo bed structure of the invention.
Figure 2B:
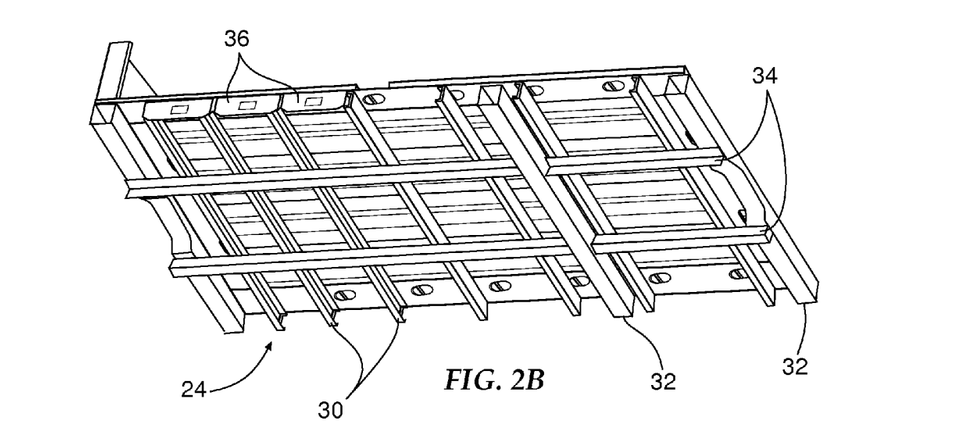
FIG. 2B is a perspective view of the sub-floor assembly underneath the load-bearing deck of one embodiment of the cargo bed structure of the invention.

The load-bearing deck 22 and the underlying sub-floor assembly 24 are shown in greater detail in FIGS. 2A and 2B. As shown in FIG. 2A, the load-bearing deck 22 comprises a plurality of decking planks 26, which can comprise a fiber reinforced polymer material, overlying the sub-floor assembly 24. The load-bearing deck 22 further comprises edging members 28 (e.g., steel edging members), which bracket the decking planks 26.

The sub-floor assembly 24 is shown in greater detail in FIG. 2B, wherein a plurality of cross members 30 is shown. The decking planks 26 of the load-bearing deck 22 extend in a direction perpendicular to the cross members 30. The sub-floor assembly 24 also may comprise one or more support beams 32 (e.g., tubular support beams) that run in a direction perpendicular to the decking planks 26. The entire sub-floor assembly 24 is carried on rails 34 that extend in the same general direction as the decking planks 26. As shown, in one embodiment, the sub-floor assembly 24 also includes a plurality of storage compartments 36 adapted for storage of the removable pivoting sidewall sections 50 described below.

Figure 3A:
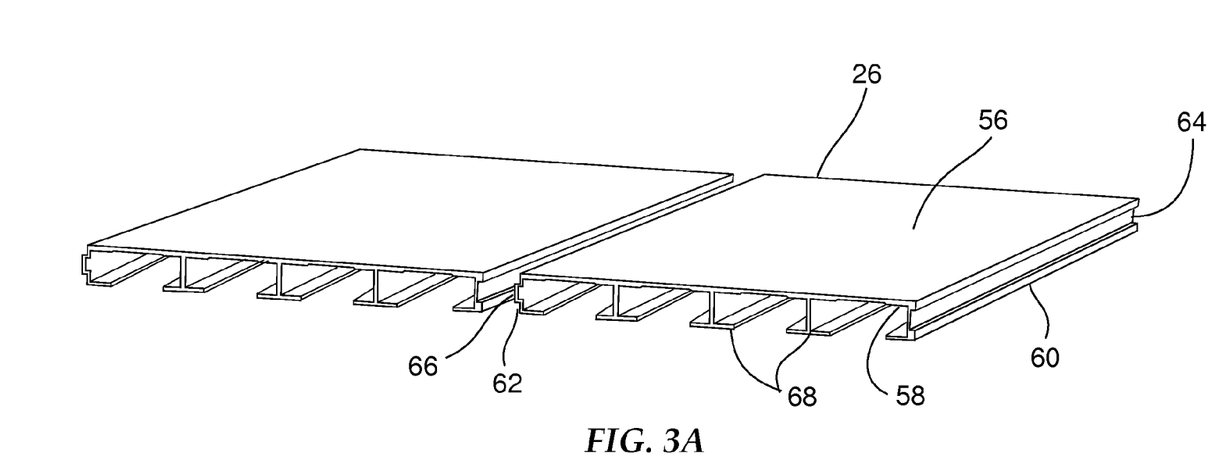
FIG. 3A is a perspective view of the decking planks of one embodiment of the load-bearing deck.
Figure 3B:
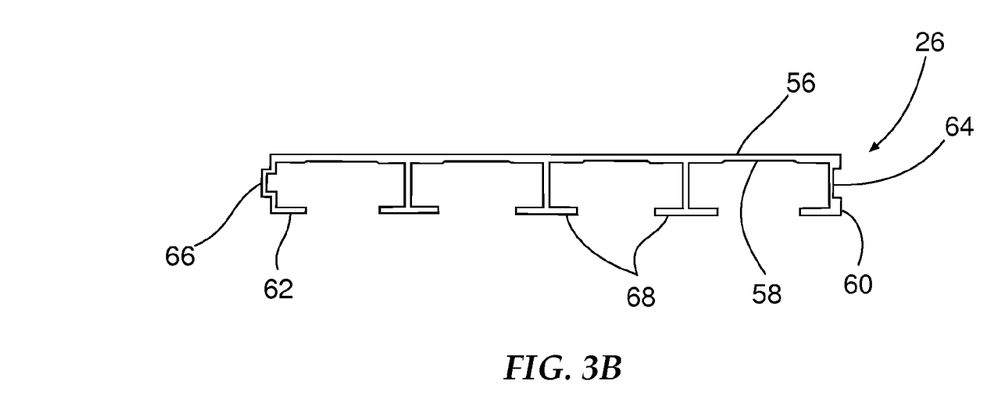
FIG. 3B is a cross-sectional view of a decking plank of one embodiment of the load-bearing deck.

FIGS. 3A and 3B illustrate one configuration for the decking planks 26 of the load-bearing deck 22. As shown, each decking plank comprises a planar section having a load-bearing surface 56 and an opposing surface 58. The planar section with the opposed surfaces has two longitudinally extending edges and first and second interlocking panels, 60 and 62, projecting from the opposing surface 58 at the location of each opposed longitudinally extending edge. As shown, the first interlocking panel 60 includes a longitudinally extending channel 64 and the second interlocking panel 62 includes a longitudinally extending protrusion 66 that is adapted in size and shape for insertion into the channel of the first interlocking panel. Although a rectangular cross section is illustrated for both the protrusion 66 and the corresponding and interlocking channel 64, other cross sectional shapes could be utilized without departing from the present invention, such as semi-circular or triangular cross sections. The protrusion 66 and corresponding channel 64 allow interlocking of adjacent decking planks 26, which improves the strength and structural integrity of the load-bearing deck.

In one embodiment, the decking plank 26 further includes a plurality of support ribs 68 extending from the opposing surface 58 of each plank, the support ribs providing a planar portion adapted for interfacing with the cross members 30 of the sub-floor assembly 24. Exemplary support ribs 68 include T-shaped and L-shaped ribs. The first and second interlocking panels, 60 and 62, can also include a planar portion adapted for interfacing with the cross members 30 that support the decking planks 26.

Figure 4:
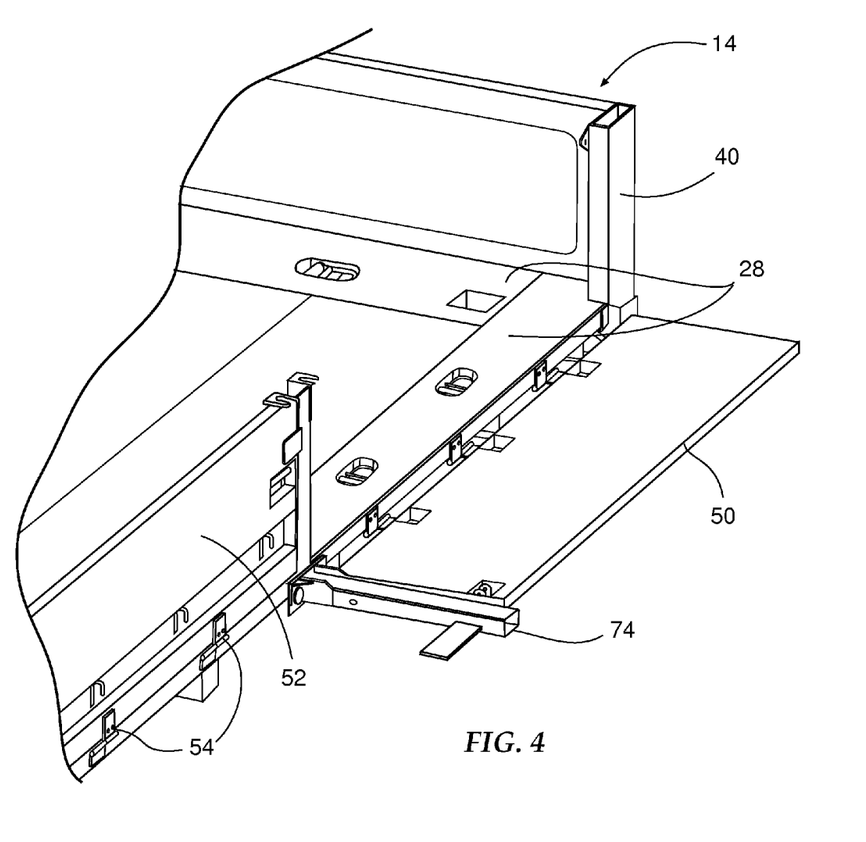
FIG. 4 is a perspective view of a pivoting sidewall panel in its lowered position according to one embodiment of the cargo bed structure of the invention.

Referring back to FIG. 1, in on embodiment of the cargo bed structure 12, the first and second sidewalls, 16 and 18, are divided into a forward section 50, 50' and a rear section 52, 52', each section being pivotally mounted to the load-bearing deck 22 via hinges 54. Each sidewall section, 50 and 52 (and 50' and 52'), are thus movable between a first upwardly extending position that is substantially perpendicular to the load bearing deck 22 and a second position extending outwardly from the load-bearing deck in substantially the same plane. The sidewall sections, 50 and 52, can be supported in the lower position by a support post 74 that can be temporarily affixed to the side of the cargo bed structure 12. As shown in FIG. 4, the support post 74 can comprise a post (e.g., a tubular member) extending outward from the cargo bed structure 12 and a substantially flat panel extending from each side of the post and operatively positioned to engage and support the sidewall sections, 50 and 52, in their lowered position. Each sidewall section or panel, 50 and 52, can be constructed of a fiber reinforced polymer material.

Figure 5:
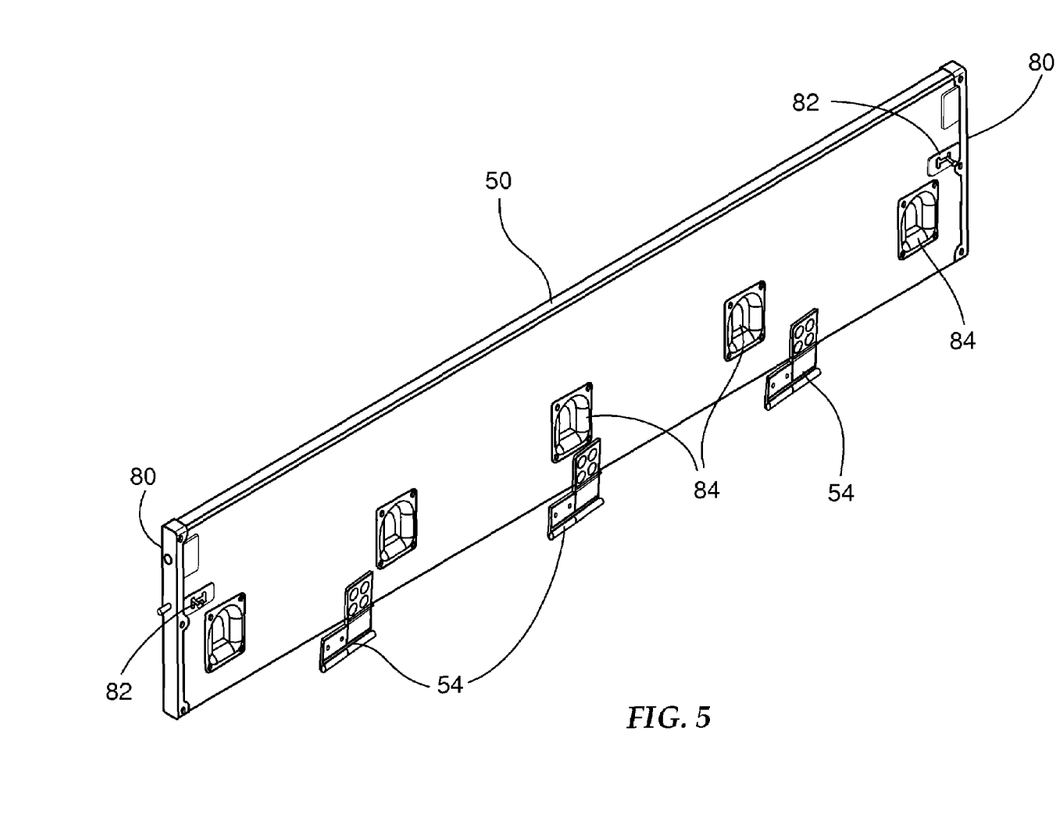
FIG. 5 is a perspective view of a sidewall panel according to one embodiment of the cargo bed structure of the invention.

Referring now to FIG. 5, a perspective view of a one embodiment of the sidewall section 50 is illustrated. As shown, the sidewall section 50 includes a plurality of hinges 54. The sidewall panel 50 also includes end caps 80 and latching mechanisms 82 operatively positioned to latch the side panel 50 to an adjacent corner post of the bulkhead assembly and operatively positioned to latch the side panel to a middle support post 44. The sidewall 50 further includes a plurality of spaced tie-down hooks 84 on the outer surface thereof.

Figure 6:
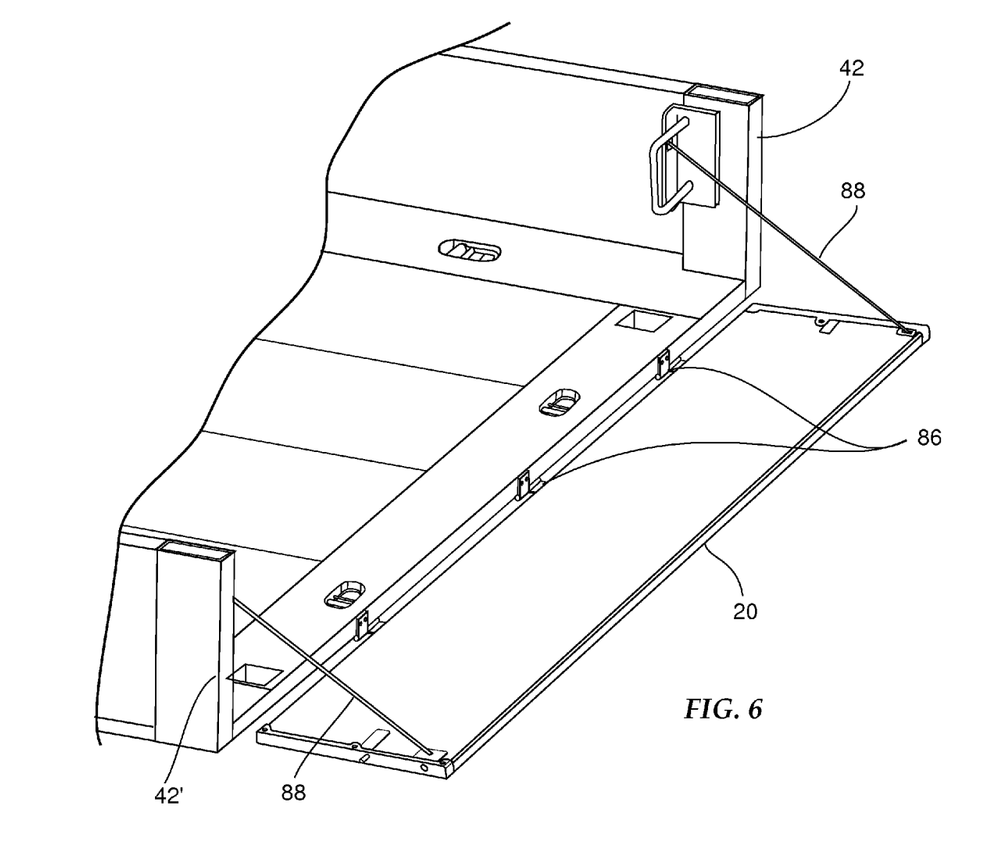
FIG. 6 is a perspective view of a tailboard section according to one embodiment of the cargo bed structure of the invention.

Referring to FIG. 6, the tailboard 20, which can be a fiber reinforced polymer panel, is shown in a lowered position. As with the sidewalls, 50 and 52, the tailboard 20 can be pivotally mounted to the load-bearing deck 22 of the cargo bed structure 12 via hinges 86. Thus, the tailboard 20 can be lowered from a first upwardly extending position that is substantially perpendicular from the load-bearing deck 22 and a second position extending outwardly from the load-bearing deck in substantially the same plane. The tailboard can be supported by cables 88 when in the lowered position. Cables 88 can be mounted to the rearward corner posts 42, 42', and can be detachable from the corner posts and the tailboard in certain embodiments.

Figure 7A:
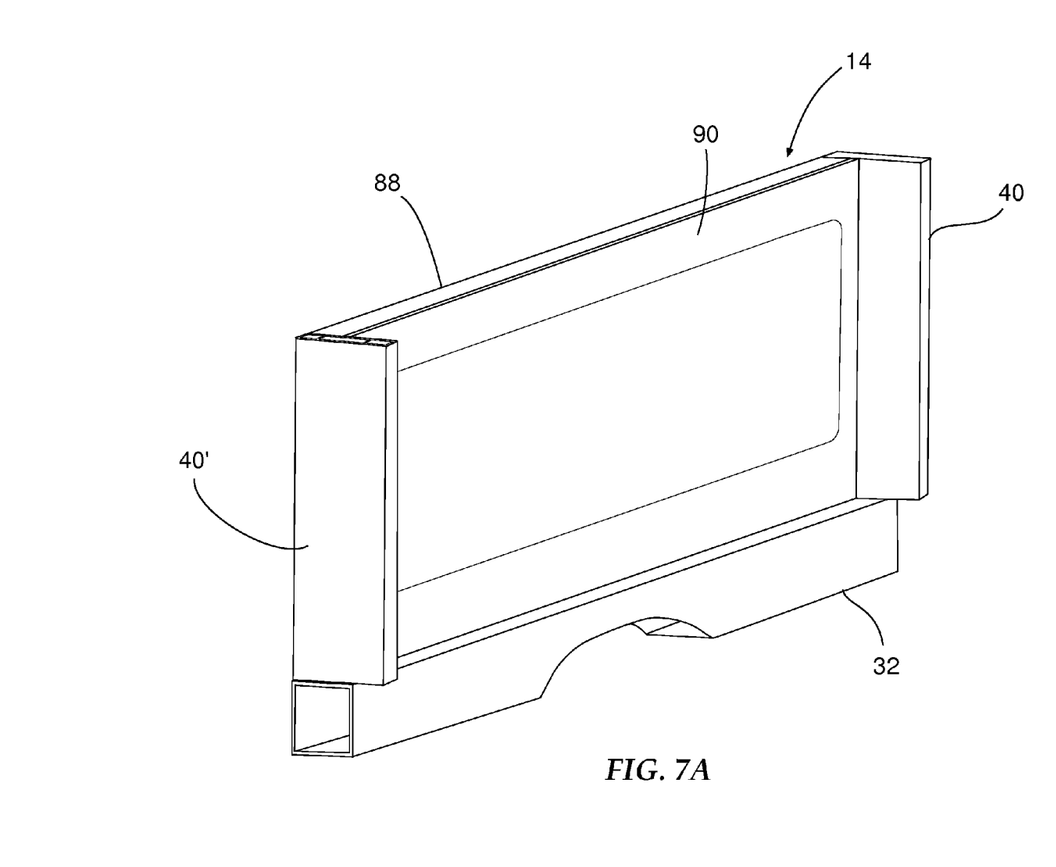
FIG. 7A is a perspective view of a bulkhead assembly according to one embodiment of the cargo bed structure of the invention.
Figure 7B:
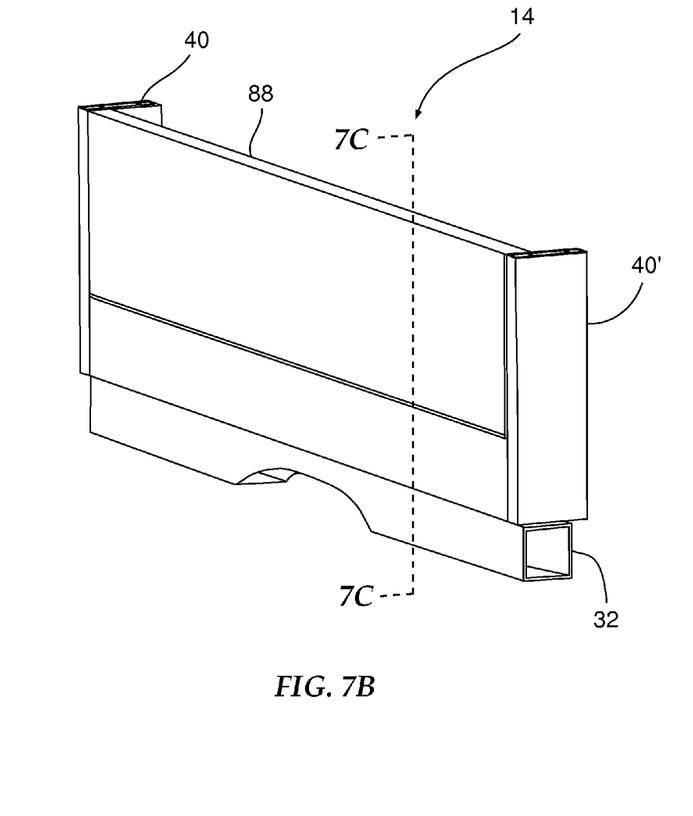
FIG. 7B is a second perspective view of a bulkhead assembly according to one embodiment of the cargo bed structure of the invention.
Figure 7C:
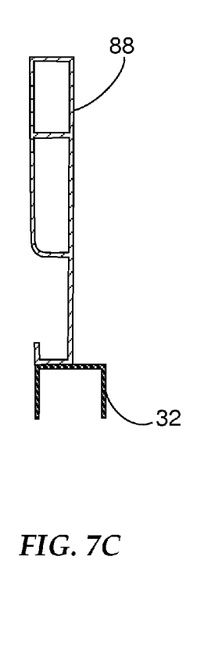
FIG. 7C is a cross-sectional view of the bulkhead assembly of FIG. 7B illustrating the cross-sectional configuration of the bulkhead panel.

The bulkhead assembly 14 is shown in FIGS. 7A-7C. Referring to FIG. 7A and FIG. 7B, the bulkhead assembly 14 is mounted on a support beam 32 (e.g., a tubular support beam) and comprises forward corner posts 40 and at least one panel 88, all of which are affixed to the support beam 32. The inward facing side of the bulkhead panel 88 relative to the cargo bed carries a bracket 90 (e.g., a steel bracket). FIG. 7C illustrates one cross sectional configuration of the bulkhead panel 88, which as described in greater detail below, may be constructed of a fiber reinforced polymer. In one embodiment, each corner post 40, 40' is constructed of a fiber reinforced polymer panel with smooth outer surfaces, and can be a substantially hollow panel if desired (e.g., with internal supporting ribs as shown).

Figure 8:
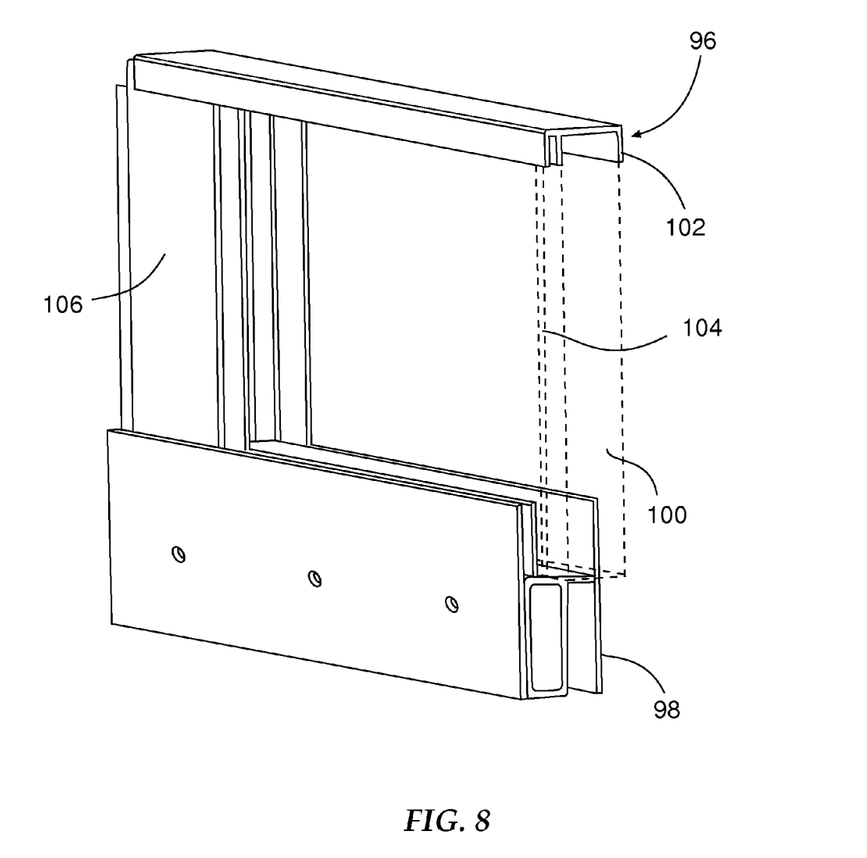
FIG. 8 is a perspective view of a window assembly section according to one embodiment of the cargo bed structure of the invention.

Turning to FIG. 8, a section of a longitudinally extending window assembly 96 is shown. The window assembly 96 comprises a lower frame member 98 adapted to support at least one removable section of ballistic glass 100. The window assembly 96 further includes a removable top frame member 102 overlying and bracketing the ballistic glass section 100. The lower frame member 98 and the top frame member 102 can be configured to include a U-shaped channel that is shaped to receive the ballistic glass section 100. The lower frame member 98 and top frame member 102 also may include a U-shaped bracket section sized to bracket and support a non-ballistic glass section 104 that is typically thinner relative to the ballistic glass section 100. The non-ballistic glass section 104 is typically disposed toward the outer surface of the window assembly 96. The window assembly 96 is designed to be mounted to the top edge of the sidewalls 50 and 52 and tailboard 20 of the cargo bed structure 12. Thus, the lower frame member 98 may include a U-shaped bracket adapted for bracketing the top of each sidewall, 50 and 52, and tailboard panel 20. Retaining pins (not shown) can be operatively positioned to temporarily affix the window assembly 96 to the sidewalls 50 and 52, as well as tailboard 20. The window assembly 96 further includes a column 106 position between each ballistic glass section 100. The top frame member 102 can be removed in order to access the individual ballistic glass sections 100 within the window assembly 96. As desired, individual ballistic glass sections 100 can be removed to create ports in the window assembly 96. After removal of the desired ballistic glass sections 100, the top frame member 102 can be reattached in a bracketing position overlying the remaining ballistic glass sections.

The ballistic glass utilized in ballistic glass sections 100 described above can be any transparent or translucent bullet-resistant or bullet proof material known in the art, such as bullet-resistant glass, bullet-proof glass, ballistic glass, glass clad laminates, and laminated polycarbonate. The non-ballistic glass sections 104 can be constructed of any translucent or transparent material known in the art as useful in windows applications, such as glass or Plexiglas. Both the ballistic glass and the non-ballistic glass can be replaced with sections or panels of other materials that are not necessarily translucent or transparent, such as sections or panels constructed of metal.

As noted above, one or more of the structural elements of the above-described cargo bed structure 12 is constructed of a fiber reinforced polymer material. For example, certain embodiments of the present invention include decking planks 26, tailboard 20, sidewall sections 50 and 52, and bulkhead panel 88 in the form of a fiber reinforced polymer composite. Further, the forward corner posts 40, 40' and the lower frame member 98 and top frame member 102 of the window assembly 96 can be constructed of a fiber reinforced polymer material. In this manner, the above described cargo bed structure 12 can be constructed largely of materials that are extremely resistant to corrosion and other environmental attack and much lighter than steel.

Further, despite the reduction in weight and the reduction in steel components, the cargo bed structure 12 of the invention meets desired performance characteristics, such as maximum load. In certain embodiments of the present invention, the cargo bed structure 12 provides decking planks 26 with a load capacity of about 2,500 lbs. to about 10,000 lbs. or more without permanent deformation, and the maximum deflection can be 6 mm at the 2,500 lbs. load level. In one embodiment, the present invention provides a cargo bed structure 12 wherein all sidewall sections 50 and 52 comprise a fiber reinforced polymer panel which can withstand a load of at least 600 lbs. when in the lowered position without permanent deformation (when load pad size is 315 mm by 315 mm and centrally positioned longitudinally and 2 inches from the non-hinged side) and a horizontally applied load of at least about 1,000 lbs. when in the raised (vertical) position without permanent deformation, more typically a load capacity of at least about 2,500 lbs in the raised position. The maximum deflection in the lowered position at a load of 600 lbs. can be 75 mm. The pad size of the horizontal test load applied to the sidewalls in the vertical position is 102 mm by 1220 mm and the load is positioned at floor height and centered longitudinally.

Certain embodiments of the cargo bed structure 12 of the invention will exhibit chemical and UV resistance according to IAW ASTM D543 and IAW ASTM G23/ASTM G1499, respectively. For example, in certain embodiments, composite components of the cargo bed structure 12 can be immersed in various solvents for at least 8 hours without changing weight by more than 10% or losing more than 10% of tensile strength, exemplary solvents including motor oils, unleaded gasoline or other hydrocarbon fuels, brake fluids, ethylene glycol, and 10% methanol. Test conditions for chemical resistance can be 73° F., 28.5 inches Hg, and RH of 50%. UV weathering testing can include exposing the composite components to UV light for 1,000 hours (consisting of cycles of 102 minutes of light exposure followed by 18 minutes of light and water spray) without visible evidence of deterioration, such as warping, cracking, peeling, or delaminating.

The fiber reinforced polymers used in the present invention may vary. The fiber reinforced polymer structures typically comprise a polymeric resin having a reinforcing fiber element embedded therein. Exemplary fiber reinforced panel structures include, but are not limited to, a solid laminate, a pultruded or vacuum-infused sandwich panel (e.g., a panel having upper and lower skins with a core therebetween), or a pultruded panel (e.g., a panel having upper and lower skins with vertical or diagonal webs therebetween). Exemplary core materials include wood, foam, and various types of honeycomb. Exemplary polymer resin materials include thermosetting resins, such as unsaturated polyesters, vinyl esters, polyurethanes, epoxies, phenolics, and mixtures thereof.

The fiber reinforcing element may comprise E-glass fibers, although other reinforcing elements such as S-glass, carbon fibers, KEVLAR®, metal (e.g., metal nano-fibers), high modulus organic fibers (e.g., aromatic polyamides, polybenzamidazoles, and aromatic polyimides), and other organic fibers (e.g., polyethylene and nylon) may be used. Blends and hybrids of such materials may also be used as a reinforcing element. Other suitable composite materials that may be used as the reinforcing element include whiskers and fibers constructed of boron, aluminum silicate, or basalt. Exemplary fiber reinforced panels and methods of making such panels are disclosed in the following U.S. patents: U.S. Pat. Nos. 5,794,402; 6,023,806; 6,044,607; 6,108,998; 6,645,333; and 6,676,785, all of which are incorporated herein in their entirety.

The sidewall sections, bulkhead panel, and tailboard can be constructed as a sandwich panel having a core and two laminated skins secured to opposite sides of the core. An exemplary commercial embodiment of a suitable sandwich panel is the TRANSONITE® composite panels available from Martin Marietta Composites of Raleigh, N.C. In one embodiment, the core of the sandwich panel is formed of a foam material with a plurality of fibers extending through the foam and connecting the two laminated skins secured to each opposing surface of the foam core.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cargo bed structure, comprising:
    a sub-floor assembly comprising a plurality of cross members in spaced relation; and
    a load-bearing deck overlying said sub-floor assembly and comprising a plurality of interlocking fiber reinforced polymer decking planks extending in a direction perpendicular to said cross members, said decking planks comprising:
        a first planar section having a load-bearing surface and an opposing surface and two opposed longitudinally extending edges;
        at least one support rib projecting from said opposing surface of said planar section, said support rib comprising a planar portion adapted for interfacing with said cross members;
        a first interlocking panel projecting from said opposing surface at one of said two opposed longitudinally extending edges of said planar section, said first interlocking panel comprising a longitudinally extending channel and a planar portion adapted for interfacing with said cross members; and
        a second interlocking panel projecting from said opposing surface at the other of said two opposed longitudinally extending edges of said planar section, said second interlocking panel comprising a longitudinally extending protrusion adapted for insertion into said longitudinally extending channel such that two adjacent decking planks are interlocked together and a planar portion adapted for interfacing with said cross members.

2. The cargo bed structure of claim 1, wherein said at least one support rib is substantially T-shaped, wherein the cross bar of the T is the planar portion adapted for interfacing with said cross members.

3. The cargo bed structure of claim 1, wherein each decking plank comprises a plurality of support ribs spaced apart across said opposing surface.

4. The cargo bed structure of claim 1, wherein said first and second interlocking panels are substantially L-shaped.

5. The cargo bed structure of claim 1, wherein the interlocking fiber reinforced polymer decking planks are of single-piece construction.

6. The cargo bed structure of claim 1, wherein said longitudinally extending channel and said protrusion are substantially rectangular in cross section.

7. The cargo bed structure of claim 1, wherein said cargo bed further comprises an upwardly-extending bulkhead assembly and opposed tailboard, and two opposing upwardly-extending sidewalls, wherein said bulkhead assembly and opposed tailboard are positioned substantially perpendicular to said opposing sidewalls.

8. The cargo bed structure of claim 7, wherein each of said sidewalls comprises at least one fiber reinforced polymer panel, said panel being pivotally mounted to said load-bearing deck such that said panel can be pivoted between a first position extending upwardly and substantially perpendicularly from said load-bearing deck and a second position extending outwardly from said load-bearing deck in substantially the same plane as said load-bearing deck.

9. The cargo bed structure of claim 8, wherein each of said opposing sidewalls comprises two fiber reinforced polymer panels, each panel pivotally mounted to said load-bearing deck.

10. The cargo bed structure of claim 9, further comprising four corner support posts affixed to said load-bearing deck at the corners thereof and a middle support post affixed to said load-bearing deck between the two fiber reinforced polymer panels of each of said sidewalls, each of said fiber reinforced polymer panels comprising a latching mechanism adapted for latching said panel to one of said corner support posts and one of said middle support posts while in said first position.

11. The cargo bed structure of claim 8, wherein each fiber reinforced polymer panel of said sidewalls can withstand a load of at least 600 pounds thereon while in said second position.

12. The cargo bed structure of claim 7, wherein said tailboard comprises a fiber reinforced panel pivotally mounted to said load-bearing deck such that said tailboard can be pivoted between a first position extending upwardly and substantially perpendicularly from said load-bearing deck and a second position extending outwardly from said load-bearing deck in substantially the same plane as said load-bearing deck.

13. The cargo bed structure of claim 12, further comprising a corner support post affixed to said load-bearing deck at each corner thereof proximate to said tailboard, wherein said fiber reinforced panel of said tailboard comprises a latching mechanism adapted for latching to each of said corner support posts proximate to said tailboard while said tailboard is in the first position.

14. The cargo bed structure of claim 7, wherein said bulkhead assembly comprises at least one fiber reinforced panel.

15. The cargo bed structure of claim 14, wherein said bulkhead assembly further comprises opposing fiber reinforced polymer corner posts positioned on either side of said fiber reinforced panel.

16. The cargo bed structure of claim 15, wherein said bulkhead assembly is affixed to a support beam.

17. The cargo bed structure of claim 7, further comprising a longitudinally extending window assembly removably attached to each of said sidewalls and said tailboard, said window assembly comprising a fiber reinforced polymer lower frame member adapted to support at least one removable section of ballistic glass, a section of ballistic glass carried by said lower frame section, and a removable fiber reinforced polymer top frame member overlying said ballistic glass section.

18. The cargo bed structure of claim 17, wherein said window assembly comprises a plurality of removable ballistic glass sections in spaced relation carried by said lower frame member, said window assembly further comprising a fiber reinforced polymer column between each ballistic glass section.

19. The cargo bed structure of claim 17, wherein said lower frame member comprises a substantially U-shaped channel operatively positioned to carry said removable ballistic glass section and a substantially U-shaped channel operatively positioned to bracket the top each of said sidewalls and said tailboard.

20. The cargo bed structure of claim 19, wherein the window assembly further comprises a plurality of retaining pins operatively positioned to temporarily affix the window assembly to the top of each of said sidewalls and said tailboard.

21. A cargo truck comprising the cargo bed structure of claim 1.

22. A cargo bed structure, comprising:
a sub-floor assembly comprising a plurality of cross members in spaced relation; and
a cargo bed comprising:
a longitudinally extending load-bearing deck overlying said sub-floor assembly and comprising a plurality of interlocking fiber reinforced polymer decking planks extending in a direction perpendicular to said cross members;
an upwardly-extending bulkhead assembly comprising at least one fiber reinforced polymer panel;
a tailboard opposing said bulkhead and spaced apart therefrom; and
two opposing upwardly-extending sidewalls;
wherein said bulkhead assembly and opposed tailboard are positioned substantially perpendicular to said opposing sidewalls, and wherein each of said sidewalls and said tailboard comprise at least one fiber reinforced polymer panel pivotally mounted to said load-bearing deck such that said sidewalls and said tailboard can be pivoted between a first position extending upwardly and substantially perpendicularly from said load-bearing deck and a second position extending outwardly from said load-bearing deck in substantially the same plane as said load-bearing deck.

23. The cargo bed structure of claim 22, wherein said decking planks comprise:
a first planar section having a load-bearing surface and an opposing surface and two opposed longitudinally extending edges;
at least one support rib projecting from said opposing surface of said planar section, said support rib comprising a planar portion adapted for interfacing with said cross members;
a first interlocking panel projecting from said opposing surface at one of said two opposed longitudinally extending edges of said planar section, said first interlocking panel comprising a longitudinally extending channel and a planar portion adapted for interfacing with said cross members; and
a second interlocking panel projecting from said opposing surface at the other of said two opposed longitudinally extending edges of said planar section, said second interlocking panel comprising a longitudinally extending protrusion adapted for insertion into said longitudinally extending channel such that two adjacent decking planks are interlocked together and a planar portion adapted for interfacing with said cross members.

24. The cargo bed structure of claim 22, further comprising a corner support posts affixed to each corner of said load-bearing deck and a middle support post affixed to each longitudinally extending side of said load-bearing deck.

25. The cargo bed structure of claim 24, wherein each sidewall comprises two adjacent fiber reinforced polymer panels, one panel positioned on each side of each of said middle support posts, and wherein each panel comprises a first latching mechanism operatively positioned to latch the panel to one of said corner support posts and a second latching mechanism operatively positioned to latch the panel to one of said middle support posts when the sidewalls are in the first position.

26. The cargo bed structure of claim 24, wherein said fiber reinforced panel of said tailboard comprises a first latching mechanism operatively positioned to latch the tailboard to a first adjacent corner support post and a second latching mechanism operatively positioned to latch the tailboard to a second adjacent corner support post when said tailboard is in the first position.

27. A cargo truck comprising the cargo bed structure of claim 22.

* * * * *